US012687949B2

(12) United States Patent
Shin et al.

(10) Patent No.: US 12,687,949 B2
(45) Date of Patent: Jul. 21, 2026

(54) TOUCH PANEL, METHOD OF INSPECTING TOUCH PANEL, AND ELECTRONIC DEVICE INCLUDING THE SAME

(71) Applicant: Samsung Display Co., Ltd., Yongin-Si (KR)

(72) Inventors: Yujin Shin, Yongin-si (KR); Hyun-Wook Cho, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 19/199,419

(22) Filed: May 6, 2025

(65) Prior Publication Data

US 2026/0044228 A1 Feb. 12, 2026

(30) Foreign Application Priority Data

Aug. 8, 2024 (KR) ........................ 10-2024-0106138

(51) Int. Cl.
*G06F 3/041* (2006.01)
*G06F 3/044* (2006.01)

(52) U.S. Cl.
CPC ........ *G06F 3/04164* (2019.05); *G06F 3/0446* (2019.05); *G06F 2203/04103* (2013.01)

(58) Field of Classification Search
None
See application file for complete search history.

(56) References Cited

U.S. PATENT DOCUMENTS

| | | | |
|---|---|---|---|
| 9,660,003 B2 | 5/2017 | Sato et al. | |
| 2015/0060817 A1* | 3/2015 | Sato ...................... | G06F 3/0446 |
| | | | 257/40 |
| 2019/0056819 A1* | 2/2019 | Moon ..................... | G06F 3/044 |
| 2019/0204963 A1* | 7/2019 | Liu ........................ | G06F 3/044 |
| 2020/0168689 A1* | 5/2020 | Park ...................... | H10K 59/50 |
| 2020/0379595 A1* | 12/2020 | Kim ...................... | G09G 3/32 |
| 2021/0357082 A1* | 11/2021 | Yang ..................... | G06F 3/0443 |
| 2022/0137738 A1* | 5/2022 | Kim ...................... | G06F 3/0443 |
| | | | 345/174 |
| 2023/0146897 A1* | 5/2023 | Han ................... | H10K 59/1216 |
| | | | 257/40 |
| 2024/0004494 A1* | 1/2024 | Bang .................. | G06F 3/04164 |

FOREIGN PATENT DOCUMENTS

| | | |
|---|---|---|
| KR | 10-1695599 B1 | 1/2017 |
| KR | 10-2021-0085021 A | 7/2021 |

* cited by examiner

*Primary Examiner* — Kenneth Bukowski
(74) *Attorney, Agent, or Firm* — Innovation Counsel LLP

(57) ABSTRACT

A touch panel includes a substrate including a sensing area and a peripheral area surrounding at least portion of the sensing area, a plurality of driving lines disposed in the peripheral area on the substrate, a plurality of sensing lines disposed on a same layer as the driving lines and disposed in the peripheral area, a first touch insulating layer covering the driving lines and the sensing lines, a first touch electrode array disposed in the sensing area on the first touch insulating layer and electrically connected to the driving lines, a second touch electrode array disposed on a same layer as the first touch electrode array and electrically connected to the sensing lines, and a plurality of detection lines disposed in the peripheral area on the first touch insulating layer and overlapping the driving lines and the sensing lines in a plan view.

20 Claims, 12 Drawing Sheets

DTL1

TIL2

TIL1

SUB2

IV          TX3-2   TX2-2   TX1-2          TX1-1   TX2-1   TX3-1          IV

DR3

DTL2

TIL2

TIL1

SUB2

V          RX5     RX4     RX3     RX2     RX1          V '

DR3

1

TOUCH PANEL, METHOD OF INSPECTING TOUCH PANEL, AND ELECTRONIC DEVICE INCLUDING THE SAME

CROSS-REFERENCE TO RELATED APPLICATION

This application claims priority to and benefits of Korean Patent Application No. 10-2024-0106138 under 35 U.S.C. § 119, filed on Aug. 8, 2024 in the Korean Intellectual Property Office (KIPO), the entire contents of which are hereby incorporated by reference.

BACKGROUND

1. Field

Embodiments provide a touch panel, a method of inspecting the touch panel, and an electronic device including the same.

2. Description of the Related Art

As information technology advances, the importance of display devices, which serve as a media connecting users and information, is becoming highlighted. Accordingly, the use of display devices such as a liquid crystal display device, an organic light emitting display device, a plasma display device, or the like is increasing.

Recently, a touch panel which recognizes touch input has been used as an input device for the display device, such as smartphones and tablet PCs. The touch panel determines whether a user has made a touch input and calculates the corresponding location as touch input coordinates.

SUMMARY

Embodiments of the present disclosure provide a touch panel having improved reliability, a method of inspecting the touch panel, and an electronic device including the touch panel.

According to an embodiment, a touch panel includes a substrate including a sensing area and a peripheral area surrounding at least portion of the sensing area, a plurality of driving lines disposed in the peripheral area on the substrate, a plurality of sensing lines disposed on a same layer as the driving lines and disposed in the peripheral area, a first touch insulating layer covering the driving lines and the sensing lines, a first touch electrode array disposed in the sensing area on the first touch insulating layer, electrically connected to the driving lines, and including a plurality of first touch electrodes arranged along a first direction, a second touch electrode array disposed on a same layer as the first touch electrode array in the sensing area, electrically connected to the sensing lines, and including a plurality of second touch electrodes arranged along a second direction intersecting the first direction, and a plurality of detection lines disposed in the peripheral area on the first touch insulating layer and overlapping the driving lines and the sensing lines in a plan view.

In an embodiment, the detection lines may include first detection lines overlapping the driving lines in the plan view, and second detection lines overlapping the sensing lines in the plan view. Each of the driving lines may be completely covered by the first detection lines and each of the sensing lines may be completely covered by the second detection lines.

In an embodiment, a width of each of the first detection lines may be a same as a width of each of the driving lines, and a width of each of the second detection lines may be a same as a width of each of the sensing lines.

In an embodiment, the touch panel may further include a touch pad part disposed in the peripheral area on the substrate and providing a touch driving signal to the first touch electrodes through the driving lines.

In an embodiment, the driving lines, the sensing lines, and the detection lines may be connected to the touch pad part.

In an embodiment, the detection lines may be disposed on a same layer as the first and second touch electrodes.

In an embodiment, the detection lines may include conductive metal oxide.

In an embodiment, the detection lines may include indium tin oxide (ITO).

In an embodiment, the touch panel may further include a second touch insulating layer covering the first and second touch electrodes, the detection lines, and including silicon compound.

In an embodiment, one of the first touch insulating layer and the second touch insulating layer may include silicon oxide.

In an embodiment, one of the driving lines and the sensing lines may include molybdenum-niobium (MoNb).

In an embodiment, the substrate may include glass.

According to an embodiment, a method of inspecting a touch panel includes forming a touch panel which includes a substrate including a sensing area and a peripheral area surrounding at least portion of the sensing area, a plurality of driving lines disposed in the peripheral area on the substrate, a plurality of sensing lines disposed on a same layer as the driving lines and disposed in the peripheral area, a first touch insulating layer covering the driving lines and the sensing lines, a first touch electrode array disposed in the sensing area on the first touch insulating layer, electrically connected to the driving lines, and including a plurality of first touch electrodes arranged along a first direction, a second touch electrode array disposed on a same layer as the first touch electrode array in the sensing area, electrically connected to the sensing lines, and including a plurality of second touch electrodes arranged along a second direction intersecting the first direction, and a plurality of detection lines disposed in the peripheral area on the first touch insulating layer and overlapping the driving lines and the sensing lines in a plan view, and measuring a current flowing through each of the detection lines.

In an embodiment, after measuring the current flowing through each of the detection lines, the method may further include determining whether a detection line among the detection lines is defective by comparing values of the current flowing through each of the detection lines. When the current flowing through the detection line is smaller than a predetermined reference current value, the detection line may be determined as defective. The predetermined reference current may be a current flowing through the detection line when the detection line is non-defective.

In an embodiment, the detection lines may include first detection lines overlapping the driving lines in the plan view, and second detection lines overlapping the sensing lines in the plan view. Each of the driving lines may be completely covered by the first detection lines and each of the sensing lines may be completely covered by the second detection lines.

In an embodiment, a width of each of the first detection lines may be a same as a width of each of the driving lines, and a width of each of the second detection lines may be a same as a width of each of the sensing lines.

In an embodiment, the touch panel may further include a touch pad part disposed in the peripheral area on the substrate and providing a touch driving signal to the first touch electrodes through the driving lines. The driving lines, the sensing lines, and the detection lines may be connected to the touch pad part.

In an embodiment, the detection lines may be formed through a same process as the first and second touch electrodes.

In an embodiment, the touch panel may further include a second touch insulating layer covering the first and second touch electrodes, the detection lines, and including silicon compound.

According to an embodiment, an electronic device includes a display panel which includes a first substrate including a display area and a non-display area surrounding at least a portion of the display area, a circuit layer disposed on the first substrate, and a light-emitting element layer disposed on the circuit layer, a touch panel disposed on the display panel and including a second substrate including a sensing area and a peripheral area surrounding at least portion of the sensing area, a plurality of driving lines disposed in the peripheral area on the second substrate, a plurality of sensing lines disposed on a same layer as the driving lines and disposed in the peripheral area, a first touch insulating layer covering the driving lines and the sensing lines, a first touch electrode array disposed in the sensing area on the first touch insulating layer, electrically connected to the driving lines, and including a plurality of first touch electrodes arranged along a first direction, a second touch electrode array disposed on a same layer as the first touch electrode array in the sensing area, electrically connected to the sensing lines, and including a plurality of second touch electrodes arranged along a second direction intersecting the first direction, and a plurality of detection lines disposed in the peripheral area on the first touch insulating layer and overlapping the driving lines and the sensing lines in a plan view, and a processor providing an image data signal and an input control signal to the display device to control the display device.

A touch panel according to an embodiment of the present disclosure may include a plurality of detection lines disposed in a peripheral area surrounding at least a portion of a sensing area and overlapping each of a plurality of driving lines and a plurality of sensing lines in a plan view. By comparing the values of current flowing through the detection lines, it is possible to determine whether a detection lines among the detection lines is defective due to scratches. Accordingly, by detecting scratched detection lines in advance, and after reliability evaluation in a high-temperature and high-humidity environment, it is possible to prevent a decline in the manufacturer's reliability due to the shipment of defective products containing a detection line corroded and scratched by moisture infiltration.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
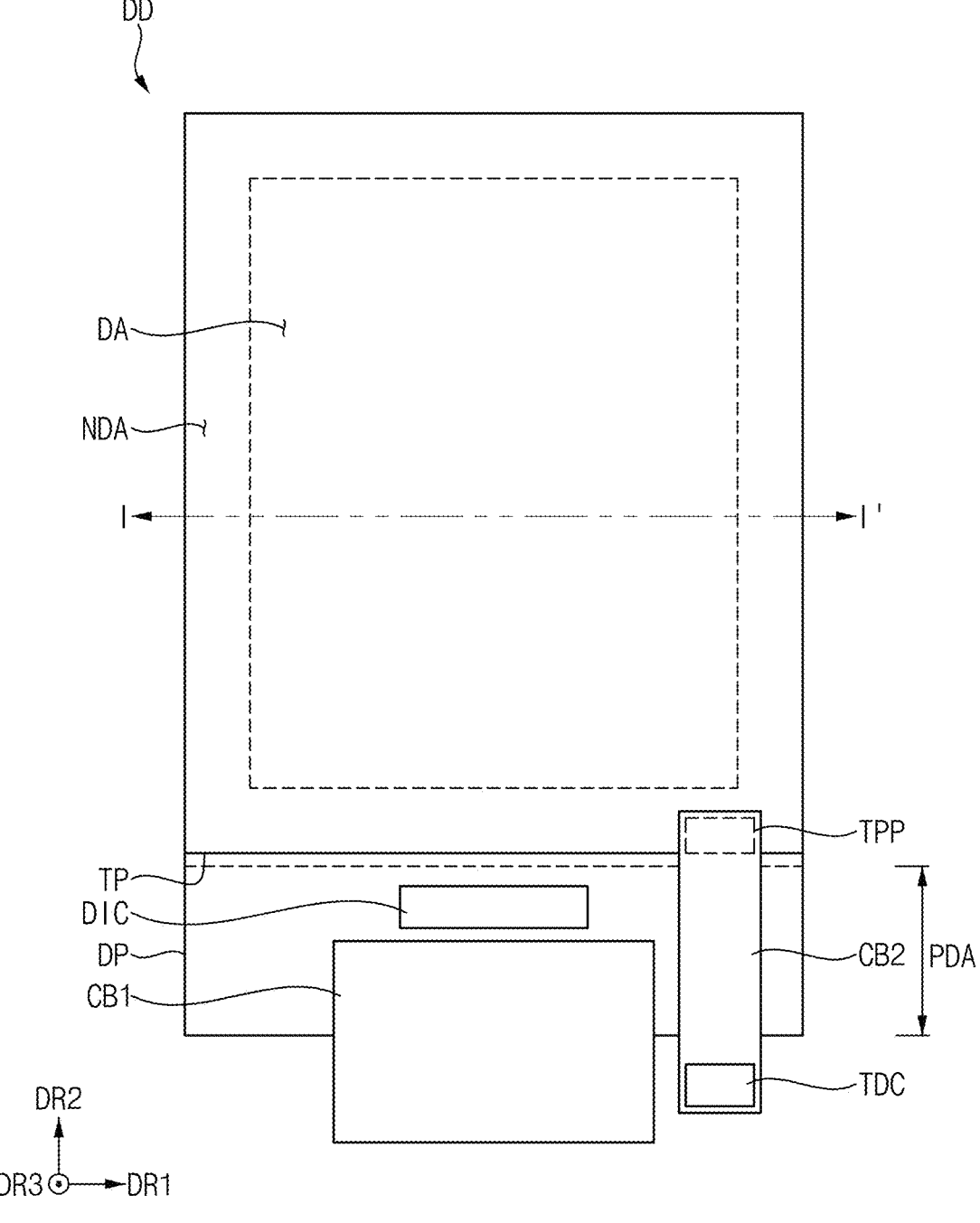
FIG. 1 is a plan view showing a display device according to an embodiment of the present disclosure.

Hereinafter, a touch panel, a method of inspecting the touch panel, and a display device including the same according to embodiments of the present disclosure will be explained in detail with reference to the accompanying drawings. The same reference numerals are used for the same components in the drawings, and redundant descriptions of the same components will be omitted.

In this specification, a plane may be defined as a first direction DR1 and a second direction DR2 intersecting the first direction DR1. For example, the first direction DR1 may be perpendicular to the second direction DR2. In addition, a third direction DR3 may be perpendicular to the plane.

Figure 2:
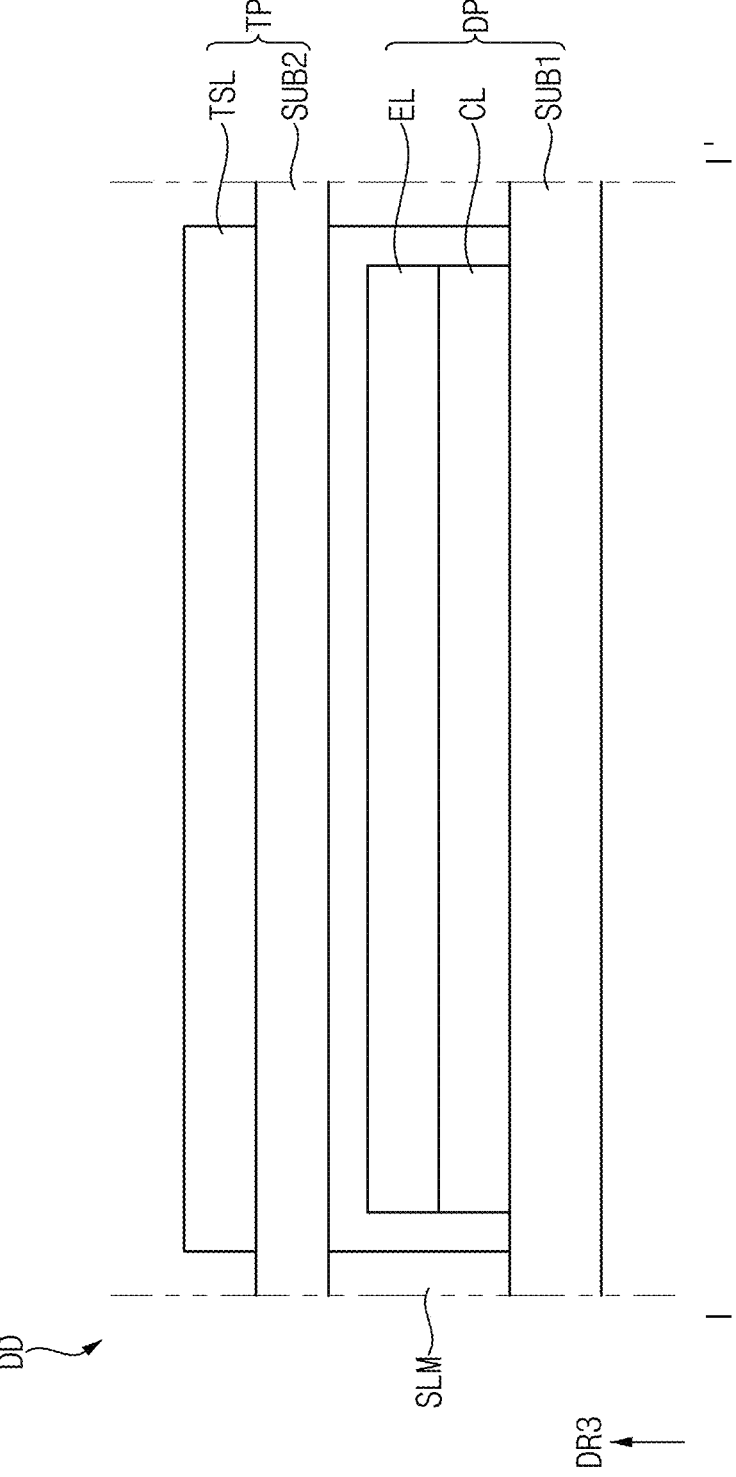
FIG. 2 is a cross-sectional view taken along a line I-I' of FIG. 1.

FIG. 1 is a plan view showing a display device according to an embodiment of the present disclosure. FIG. 2 is a cross-sectional view taken along a line I-I' of FIG. 1.

Referring to FIG. 1, the display device DD according to an embodiment of the present disclosure may include a display panel DP, a display driving circuit DIC, a first circuit board CB1, a touch panel TP, a second circuit board CB2, a touch driving circuit TDC, and a sealing member SLM.

The display panel DP may include a display area DA and a non-display area NDA. The display area DA may be an area that can display an image by generating light or adjusting the transmittance of light provided from an external light source. The non-display area NDA may be an area that does not display images. The non-display area NDA may surround at least a portion of the display area DA. For example, the non-display area NDA may entirely surround the display area DA.

A plurality of pixels may be disposed (or located) in the display area DA. Each of the pixels may emit light. As the pixels emit light, the display area DA may display an image. Lines connected to the pixels may be further disposed (or located) in the display area DA. For example, the lines may include data lines, scan signal lines, power lines, or the like. A detailed description of this will be provided later.

A driver for driving the pixels may be disposed in the non-display area NDA. For example, the driver may include a scan driver, a power voltage generator, a timing controller, or the like. The pixels may emit light based on signals received from the drivers.

The non-display area NDA may include a pad area PDA. The pad area PDA may be located on one side of the display area DA. For example, the pad area PDA may be located spaced apart from one side of the display area DA in a direction opposite to the second direction DR2 parallel to an upper surface of the display panel DP.

The display driving circuit DIC may be disposed (or located) in the pad area PDA on the display panel DP. For example, the display driving circuit DIC may be disposed (or located) between the first circuit board CB1 and the display area DA in a plan view. The display driving circuit DIC may generate various signals and voltages for driving the pixels.

For example, the display driving circuit DIC may be formed as an integrated circuit and mounted on the pad area PDA of the display panel DP using a chip on glass (COG) method or a chip on plastic (COP) method. However, the present disclosure is not limited thereto. For example, the display driving circuit DIC may be mounted on a flexible film connecting the first circuit board CB1 and the display panel DP.

The first circuit board CB1 may be connected to the pad area PDA. For example, the first circuit board CB1 may be attached to the pad area PDA through an adhesive member. The adhesive member may include an anisotropic conductive film. For example, the first circuit board CB1 may be a printed circuit board (PCB) or a flexible printed circuit board (FPCB).

The display panel DP may include a first substrate SUB1, a circuit layer CL, and a light-emitting element layer EL.

As described above, the display panel DP may include the display area DA and the non-display area NDA. As the display panel DP includes the display area DA and the non-display area NDA, the first substrate SUB1 may also include the display area DA and the non-display area NDA.

The first substrate SUB1 may include a transparent material or an opaque material. For example, the first substrate SUB1 may include an insulating material such as glass, quartz, or polymer resin. Examples of the polymer resin that can be used as the first substrate SUB1 may include polyethersulfone (PES), polyacrylate (PA), polyarylate (PAR), polyetherimide (PEI), polyethylene napthalate (PEN), polyethylene terephthalate (PET), polyimide (PI), polycarbonate (PC), or the like. These can be used alone or in combination with each other. In an embodiment, the first substrate SUB1 may include glass.

The circuit layer CL may be disposed (or located) on the first substrate SUB1. For example, the circuit layer CL may include a transistor, a data line, a scan signal line, a power line, a scan control line, or the like. The circuit layer CL may overlap the display area DA and the non-display area NDA. For example, the transistor, the data line, the scan signal line, and the power line of the circuit layer CL may overlap the display area DA and the non-display area NDA, while the scan control line may overlap the non-display area NDA. A detailed description of the components of the circuit layer CL will be described later.

The light-emitting element layer EL may be disposed (or located) on the circuit layer CL. The light-emitting element layer EL may include a light-emitting element which emits light and a pixel defining layer defining a pixel. The light-emitting element of the light emitting device layer EL may overlap the display area DA. A detailed description of the components of the light-emitting element layer EL will be described later.

The touch panel TP may include a second substrate SUB2 and a touch sensing layer TSL.

The second substrate SUB2 may include a transparent material or an opaque material. For example, the second substrate SUB2 may include an insulating material such as glass, quartz, or polymer resin. Examples of the polymer resin that can be used as the second substrate SUB2 may include polyethersulfone, polyacrylate, polyarylate, polyetherimide, polyethylene naphthalate, polyethylene terephthalate, polyimide, polycarbonate, or the like. These can be used alone or in combination with each other. In an embodiment, the second substrate SUB2 may include glass. The second substrate SUB2 may serve as an encapsulation substrate encapsulating the light-emitting element layer EL.

The touch sensing layer TSL may be disposed (or located) on the second substrate SUB2. The touch sensing layer TSL may include a plurality of touch electrode arrays for sensing user's touch input in a capacitive manner, a touch pad part, and a plurality of touch driving lines and a plurality of touch sensing lines electrically connecting the touch pad part and the touch electrode arrays. For example, the touch sensing layer TSL may detect the user's touch using a self-capacitance method or a mutual capacitance method. However, embodiments of the present disclosure are not necessarily limited thereto.

The second circuit board CB2 may be connected to a peripheral area (e.g., a peripheral area PA of FIG. 5) of the touch panel TP. For example, the second circuit board CB2 may be connected to the touch pad part TPP disposed (or located) on the peripheral area of the touch panel TP. For example, the second circuit board CB2 may be a printed circuit board (PCB) or a flexible printed circuit board (FPCB). The second circuit board CB2 may be referred to as a touch circuit board.

The touch driving circuit TDC may be disposed (or located) on the second circuit board CB2. For example, the touch driving circuit TDC may be formed as an integrated circuit and mounted on the second circuit board CB2. The touch driving circuit TDC may apply touch driving signals to the touch electrodes of the touch panel TP and measure the capacitance values of the touch electrodes. The touch driving signal may be a signal having a plurality of driving pulses. The touch driving circuit TDC may determine whether a touch is input based on the capacitance values of the touch electrodes and calculate touch coordinates where a touch is input.

An anti-reflection layer and a cover window may be additionally disposed (or located) on the touch sensing layer TSL. In this case, the anti-reflection layer may be disposed (or located) on the touch sensing layer TSL, and the cover window may be attached to the anti-reflection layer using a transparent adhesive member.

The sealing member SLM may couple the first substrate SUB1 of the display panel DP and the second substrate SUB2 of the touch panel TP in the non-display area NDA. For example, the sealing member SLM may include a frit adhesive layer, an ultraviolet curable resin, or a thermosetting resin. However, embodiments of the present disclosure are not necessarily limited thereto.

In FIG. 2, a space between the light-emitting element layer EL and the second substrate SUB2 is shown to be empty, however, embodiments of the present disclosure are not necessarily limited thereto. For example, a filling film may be disposed (or located) between the light-emitting element layer EL and the second substrate SUB2. The filling film may include an epoxy filling film or a silicone filling film. However, embodiments of the present disclosure are not necessarily limited thereto.

For example, the display device DD may be any one of an organic light-emitting display device (OLED), a liquid crystal display device (LCD), a quantum dot emission display device, a micro LED display device, a field emission display device (FED), a plasma display device (PDP), and electrophoretic display device (EPD). Hereinafter, the display device DD has been described primarily as an organic light-emitting display device, but the embodiments of the present disclosure are not limited to this.

Figure 3:
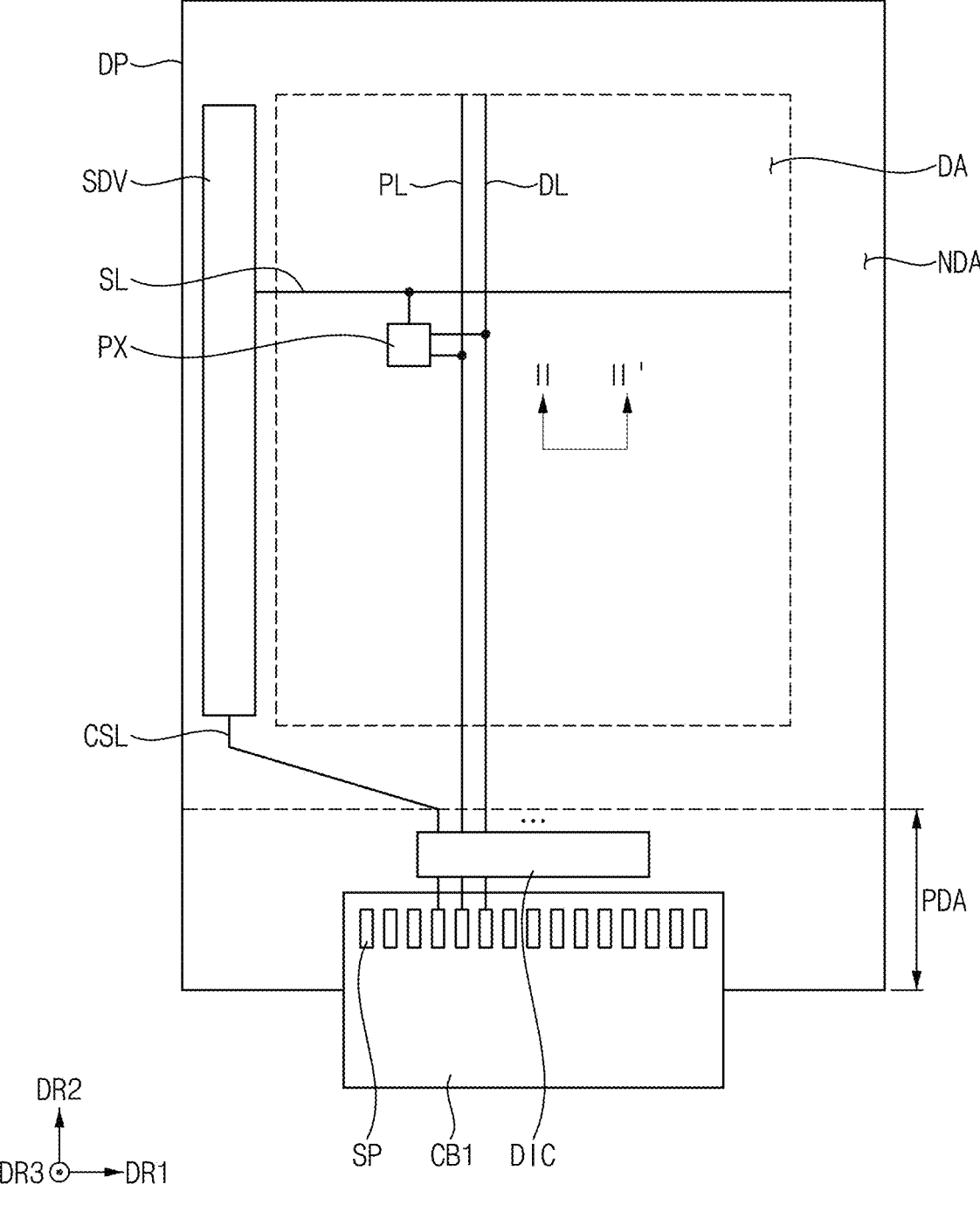
FIG. 3 is a plan view showing a display panel, a display driving circuit, and a first circuit board of FIG. 1.

FIG. 3 is a plan view showing a display panel, a display driving circuit, and a first circuit board of FIG. 1.

Referring to FIG. 3, the display panel DP may include a plurality of pixels PX, a scan driver SDV, a scan signal line SL, a scan control line CSL, a power line PL, a data line DL, and a plurality of signal pads SP. Hereinafter, content that was already mentioned above with reference to FIGS. 1 and 2 will be omitted or simplified.

The pixels PX may be arranged in the display area DA. For example, the pixels PX may be arranged in a matrix form in the display area DA along the first direction DR1 and the second direction DR2. Each of the pixels PX may include at least one driving transistor, at least one switching transistor, a light-emitting element (e.g., an organic light-emitting diode), and at least one capacitor. The scan driver SDV may be disposed (or located) in the non-display area NDA. The scan driver SDV may provide scan signals for driving the pixels PX.

The signal pads SP may be disposed (or located) in the pad area PDA. The signal pads SP may be spaced apart from each other along the first direction DR1. The signal pads SP may be electrically connected to the display driving circuit DIC through signal lines. Each of the signal pads SP may include metal, alloy, metal nitride, conductive metal oxide, transparent conductive material, or the like. These can be used alone or in combination with each other.

The scan signal line SL, the data line DL, and the power line PL may be electrically connected to the pixels PX and may be disposed (or located) in the display area DA. Each of the scan signal line SL, the data line DL, and the power line PL may be disposed (or located) in a portion of the non-display area NDA. The scan control line CSL may be electrically connected to the scan driver SDV and disposed (or located) in the non-display area NDA.

The scan signal line SL may extend in the first direction DR1. The scan signal line SL may be electrically connected to the scan driver SDV. The scan signal line SL may receive the scan signal from the scan driver SDV and provide the scan signal to the pixels PX.

The data line DL may extend in the second direction DR2. The data line DL may be electrically connected to the display driving circuit DIC. The data line DL may receive a data voltage from the display driving circuit DIC and provide the data voltage to the pixels PX.

The power line PL may extend in the second direction DR2. The power line PL may be electrically connected to the display driving circuit DIC. The power line PL may receive the power voltage from the display driving circuit DIC and provide the power voltage to the pixels PX.

The scan control line CSL may be electrically connected to the display driving circuit DIC. Accordingly, the scan control line CSL may receive a control signal from the display driving circuit DIC and provide the control signal to the scan driver SDV.

The display driving circuit DIC may provide the data voltage to the data line DL, the power voltage to the power line PL, and the control signal to the scan control line CSL.

The first circuit board CB1 may be attached to the signal pads SP of the display panel DP through an adhesive member (e.g., an anisotropic conductive film).

Figure 4:
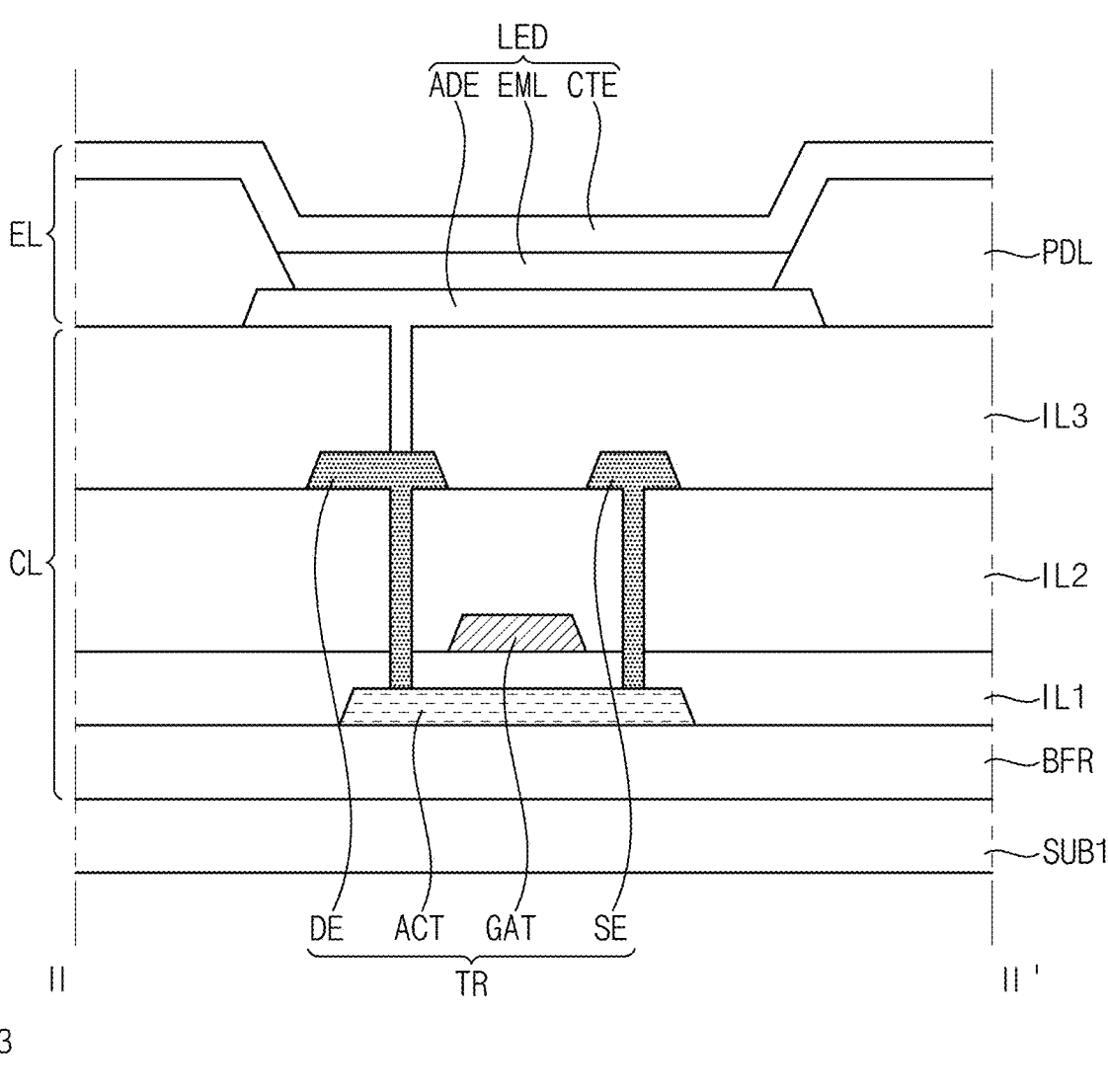
FIG. 4 is a cross-sectional view taken along a line II-II' of FIG. 3.

FIG. 4 is a cross-sectional view taken along a line II-II' of FIG. 3. For example, FIG. 4 is a cross-sectional view showing one pixel PX of FIG. 3.

Referring to FIG. 4, the display panel DP may include the first substrate SUB1, the circuit layer CL disposed (or located) on the first substrate SUB1, the light-emitting element layer EL disposed (or located) on the circuit layer CL. The circuit layer CL may include a buffer layer BUF, a transistor TR, a first insulating layer IL1, a second insulating layer IL2, and a third insulating layer IL3. The light-emitting element layer EL may include a light emitting element LED and a pixel defining layer PDL.

The buffer layer BUF may be disposed (or located) on the first substrate SUB1. The buffer layer BUF may prevent metal atoms or impurities from diffusing from the first substrate SUB1 to the transistor TR. In addition, the buffer layer BUF may improve the flatness of the surface of the first substrate SUB1 when the surface of the first substrate SUB1 is not uniform. For example, the buffer layer BUF may include an inorganic material such as silicon oxide ($SiO_x$), silicon nitride ($SiN_x$), silicon oxynitride ($SiO_xN_y$), or the like. These can be used alone or in combination with each other.

An active pattern ACT may be disposed (or located) on the buffer layer BUF. The active pattern ACT may include a metal oxide semiconductor, an inorganic semiconductor (e.g., amorphous silicon, poly silicon, and the like), or an organic semiconductor. The active pattern ACT may include a source region, a drain region, and a channel region located between the source region and the drain region.

The metal oxide semiconductor may include a binary compound ($AB_x$), a ternary compound ($AB_xC_y$), or a quaternary compound ($AB_xCD_z$) containing indium (In), zinc (Zn), gallium (Ga), tin (Sn), titanium (Ti), aluminum (Al), hafnium (Hf), zirconium (Zr), magnesium (Mg), or the like. For example, the metal oxide semiconductor may include zinc oxide ($ZnO_x$) (e.g. ZnO or $ZnO_2$), gallium oxide ($GaO_x$), tin oxide ($SnO_x$), indium oxide ($InO_x$), indium gallium oxide (IGO), indium zinc oxide (IZO), indium tin oxide. (ITO), indium zinc tin oxide (IZTO), indium gallium zinc oxide (IGZO), or the like. These can be used alone or in combination with each other.

The first insulating layer IL1 may be disposed (or located) on the buffer layer BUF. The first insulating layer IL1 may sufficiently cover the active pattern ACT and may have a substantially flat upper surface without creating a step around the active pattern ACT. The first insulating layer IL1 may cover the active pattern ACT and may be disposed along the profile of the active pattern ACT with a uniform thickness. For example, the first insulating layer IL1 may include an inorganic material such as silicon oxide, silicon nitride, silicon oxynitride, silicon carbide ($SiC_x$), silicon oxycarbide ($SiO_xC_y$), or the like. These can be used alone or in combination with each other.

The gate electrode GAT may be disposed (or located) on the first insulating layer IL1. The gate electrode GAT may overlap the channel area of the active pattern ACT. The gate electrode GAT may include metal, alloy metal nitride, conductive metal oxide, transparent conductive material, or the like. Examples of the metal that can be used as the gate electrode GAT may include silver (Ag), molybdenum (Mo), aluminum (Al), tungsten (W), copper (Cu), nickel (Ni), chromium (Cr), titanium (Ti), tantalum (Ta), platinum (Pt), scandium (Sc), or the like. Examples of the conductive metal oxide that can be used as the gate electrode GAT may include indium tin oxide, indium zinc oxide, or the like. In addition, examples of the metal nitride that can be used as the gate electrode GAT may include aluminum nitride (AlN$_x$), tungsten nitride (WN$_x$), chromium nitride (CrN$_x$), or the like. These can be used alone or in combination with each other.

The second insulating layer IL2 may be disposed (or located) on the first insulating layer IL1. The second insulating layer IL2 may sufficiently cover the gate electrode GAT and may have a substantially flat top surface without creating a step around the gate electrode GAT. The second insulating layer IL2 may cover the gate electrode GAT and may be disposed with a uniform thickness along the profile of each gate electrode GAT. For example, the second insulating layer IL2 may include an inorganic material such as silicon oxide, silicon nitride, silicon oxynitride, silicon carbide, silicon oxycarbide, or the like. These can be used alone or in combination with each other.

A source electrode SE and a drain electrode DE may be disposed (or located) on the second insulating layer IL2. The source electrode SE may be connected to the source region of the active pattern ACT through a contact hole extending through a first portion of the first insulating layer IL1 and the second insulating layer IL2. The drain electrode DE may be connected to the drain region of the active pattern ACT through a contact hole extending through a second portion of the first insulating layer IL1 and the second insulating layer IL2. For example, each of the source electrode SE and the drain electrode DE may include a metal, alloy, metal nitride, conductive metal oxide, transparent conductive material, or the like. These can be used alone or in combination with each other.

Accordingly, the transistor TR including the active pattern ACT, the gate electrode GAT, the source electrode SE, and the drain electrode DE may be formed in the display area DA.

The third insulating layer IL3 may be disposed (or located) on the second insulating layer IL2. The third insulating layer IL3 may sufficiently cover the source electrode SE and the drain electrode DE. The third insulating layer IL3 may include an inorganic material or an organic material. For example, the third insulating layer IL3 may include an organic material such as phenolic resin, polyacrylates resin, polyimides resin, polyamides resin, siloxane resin, epoxy resin, or the like. These can be used alone or in combination with each other.

An anode electrode ADE included in the light-emitting element LED may be disposed (or located) on the third insulating layer IL3. The anode electrode ADE may be connected to the drain electrode DE (or the source electrode SE) of the transistor TR through a contact hole extending through the third insulating layer IL3. For example, the anode electrode ADE may include metal, alloy, metal nitride, conductive metal oxide, transparent conductive material, or the like. These can be used alone or in combination with each other. For example, the anode electrode ADE may have a layered structure including ITO/Ag/ITO. However, embodiments of the present disclosure are not necessarily limited thereto.

The pixel defining layer PDL may be disposed (or located) on the third insulating layer IL3. The pixel defining layer PDL may cover an edge of the anode electrode ADE. The pixel defining layer PDL may include an organic material. For example, the pixel defining layer PDL may include an organic material such as epoxy resin, siloxane resin, or the like. These can be used alone or in combination with each other. For example, the pixel defining layer PDL may include an organic material containing a light blocking material such as black pigment, black dye, and the like.

A light-emitting layer EML may be disposed (or located) on the anode electrode ADE. The light-emitting layer EML may include an organic material which emits light of a selected color. For example, the light-emitting layer EML may include an organic material which emits red light, green light, or blue light.

A cathode electrode CTE may be disposed (or located) on the light-emitting layer EML and the pixel defining layer PDL. For example, the cathode electrode CTE may include metal, alloy, metal nitride, conductive metal oxide, transparent conductive material, or the like. These can be used alone or in combination with each other.

Accordingly, the light-emitting element LED including the anode electrode ADE, the light-emitting layer EML, and the cathode electrode CTE may be formed in the display area DA. The light-emitting element LED may be electrically connected to the transistor TR.

Figure 5:
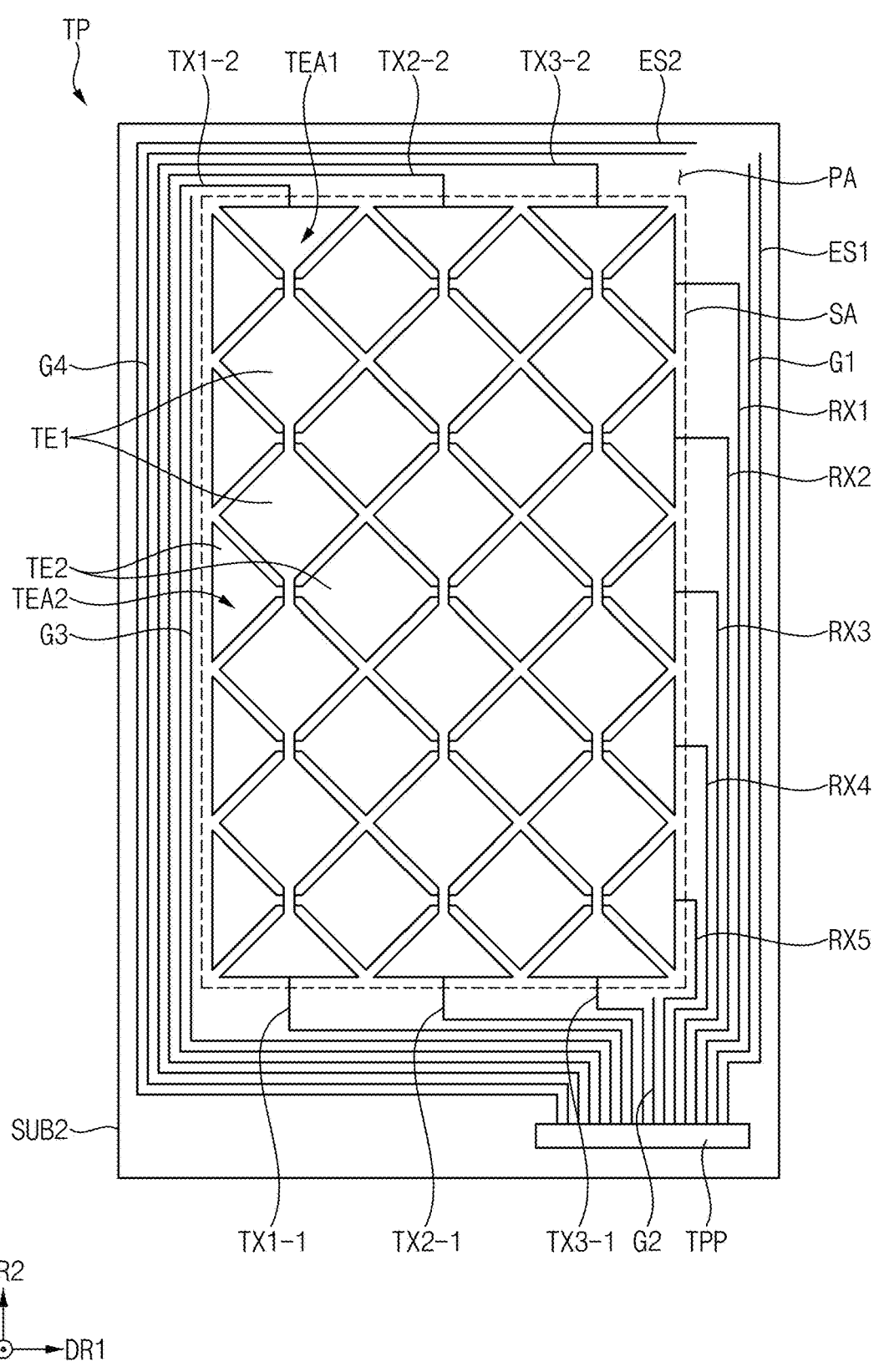
FIG. 5 is a plan view showing a touch panel of FIG. 1.
Figure 6:
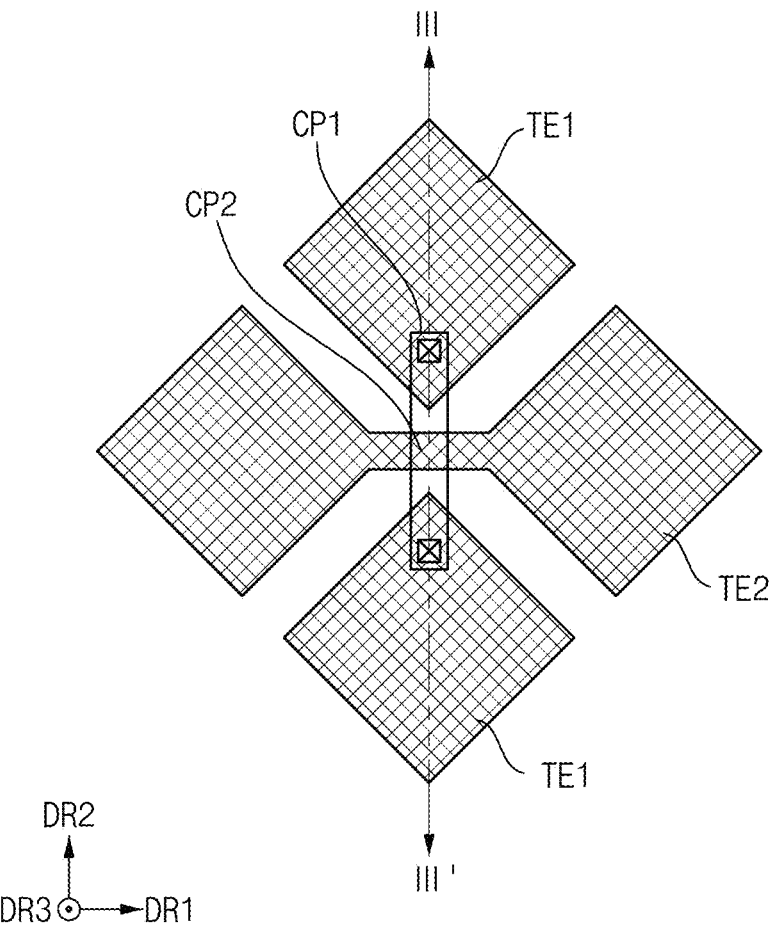
FIG. 6 is a plan view showing a first touch electrode and a second touch electrode of FIG. 5.

FIG. 5 is a plan view showing a touch panel of FIG. 1. FIG. 6 is a plan view showing a first touch electrode and a second touch electrode of FIG. 5.

Referring to FIG. 5, the touch panel TP may include a sensing area SA for sensing a user's touch and a peripheral area PA where the user's touch is not sensed. The peripheral area PA may surround at least a portion of the sensing area SA. For example, the peripheral area PA may entirely surround the sensing area SA.

As the touch panel TP includes the sensing area SA and the peripheral area PA, the second substrate SUB2 may also include the sensing area SA and the peripheral area PA.

The sensing area SA may correspond to the display area DA of the display panel DP as illustrated in FIGS. 1 and 3, and the peripheral area PA may correspond to the non-display area NDA of the display panel DP in FIGS. 1 and 3. That is, the sensing area SA may overlap the display area DA in the plan view, and the peripheral area PA may overlap the non-display area NDA in the plan view. However, the present disclosure is not limited thereto. For example, the sensing area SA may partially overlap the non-display area NDA in the plan view.

The touch sensing layer (e.g., the touch sensing layer TSL of FIG. 2) of the touch panel TP may include a plurality of first touch electrode arrays TEA1, a plurality of second touch electrode arrays TEA2, a plurality of driving lines TX1-1, TX2-1, TX3-1, TX1-2, TX2-2, and TX3-2, a plurality of sensing lines RX1, RX2, RX3, and RX4, a plurality of guard lines G1, G2, G3, and G4, a plurality of grounds lines ES1 and ES2, and the touch pad part TPP.

Each of the first touch electrode arrays TEA1 may extend in the second direction DR2. In addition, the first touch electrode arrays TEA1 may be repeatedly arranged along the first direction DR1.

Each of the second touch electrode arrays TEA2 may extend in the first direction DR1. In addition, the second touch electrode arrays TEA2 may be repeatedly arranged along the second direction DR2.

The first touch electrode array TEA1 may include a plurality of first touch electrodes TE1 and a first connection portion CP1, and the second touch electrode array TEA2 may include a plurality of second touch electrodes TE2 and a second connection portion CP2.

In an embodiment, the first touch electrodes TE1, the second touch electrodes TE2, and the second connection portion CP2 may include the same material and be disposed on the same layer. That is, the first touch electrodes TE1, the second touch electrodes TE2, and the second connection portion CP2 may be formed through the same process. However, the present disclosure is not limited thereto. For example, the first touch electrodes TE1, the second touch electrodes TE2, and the first connection portion CP1 may include the same material and be disposed on the same layer. For the sake of convenience in further explaining the present disclosure, the following descriptions are provided under the assumption that the first touch electrodes TE1, the second touch electrodes TE2, and the second connection portion CP2 includes the same material and are disposed on the same layer.

The first touch electrodes TE1, the second touch electrodes TE2, and the second connection portion CP2 may include conductive metal oxide. For example, the first touch electrodes TE1, the second touch electrodes TE2, and the second connection part CP2 may include indium gallium oxide (IGO), indium zinc oxide (IZO), indium tin oxide (ITO), indium zinc tin oxide (IZTO), indium gallium zinc oxide (IGZO), or the like. These can be used alone or in combination with each other. In an embodiment, the first touch electrodes TE1, the second touch electrodes TE2, and the second connection part CP2 may include indium tin oxide (ITO).

The first connection portion CP1 may include a conductive material. For example, the first connection portion CP1 may include molybdenum (Mo), aluminum (Al), platinum (Pt), silver (Ag), gold (Au), nickel (Ni), titanium (Ti), tantalum. (Ta), copper (Cu), niobium (Nb), or the like. These can be used alone or in combination with each other. The first connection portion CP1 may be formed as a single layer or multilayer. In an embodiment, the first connection portion CP1 may include molybdenum-niobium (MoNb).

One of the first touch electrode TE1 and the second touch electrode TE2 may be a driving electrode, and the other may be a sensing electrode. In the following descriptions, the first touch electrodes TE1 are exemplified as driving electrodes and the second touch electrodes TE2 are exemplified as sensing electrodes for the convenience of explanation about the present disclosure.

The first touch electrodes TE1 may be repeatedly arranged along the second direction DR2 and may be electrically connected to each other along the second direction DR2. For example, two adjacent first touch electrodes TE1 may be connected through the first connection portion CP1 disposed (or located) between the two adjacent first touch electrodes TE1. That is, the first connection portion CP1 may be connected to the two adjacent first touch electrodes TE1 through contact holes.

For example, some of the first touch electrodes TE1 may have a diamond shape in the plan view. In this case, the other part of the first touch electrodes TE1 located at the outermost part of the sensing area SA may have a half-diamond shape in the plan view.

The second touch electrodes TE2 may be repeatedly arranged along the first direction DR1 and may be electrically connected to each other along the first direction DR1. For example, two adjacent second touch electrodes TE2 may be connected through the second connection portion CP2 disposed (or located) between the two adjacent second touch electrodes TE2. The second connection portion CP2 may be formed integrally with the two adjacent second touch electrodes TE2. That is, the second connection portion CP2 may be directly and physically connected to the two adjacent second touch electrodes TE2.

For example, some of the second touch electrodes TE2 may have a diamond shape in the plan view. In this case, the other part of the second touch electrodes TE2 located at the outermost part of the sensing area SA may have a half-diamond shape in the plan view.

The first touch electrode arrays TEA1 and the second touch electrode arrays TEA2 may be physically separated from each other, and a gap may exist between the first touch electrode arrays TEA1 and the second touch electrode arrays TEA2.

The driving lines TX1-1, TX2-1, TX3-1, TX1-2, TX2-2, and TX3-2 may electrically connect the first touch electrode arrays TEA1 to the touch pad part TPP. For example, the driving lines TX1-1, TX2-1, TX3-1, TX1-2, TX2-2, and TX3-2 may include first driving lines TX1-1, TX2-1, and TX3-1 connected to a lower end of the first touch electrode arrays TEA1 and second driving lines TX1-2, TX2-2, and TX3-2 connected to an upper end of the first touch electrode arrays TEA1. The first driving lines TX1-1, TX2-1, and TX3-1 may extend from the touch pad part TPP in the second direction DR2 and be connected to the lower end of the first touch electrode arrays TEA1. The second driving lines TX1-2, TX2-2, and TX3-2 may extend from the touch pad part TPP in the second direction DR2, bypass a left edge of the sensing area SA, and be connected to the upper end of the first touch electrode arrays TEA1.

The sensing lines RX1, RX2, RX3, RX4, and RX5 may electrically connect the second touch electrode arrays TEA2 to the touch pad part TPP. For example, one of the sensing lines RX1, RX2, RX3, RX4, and RX5 may be connected to one of the second touch electrode arrays TEA2. Each of the sensing lines RX1, RX2, RX3, RX4, and RX5 may extend from the touch pad part TPP in the second direction DR2, extend toward a right edge of the sensing area SA, and be connected to a right end of the second touch electrode arrays TEA2.

A touch driving signal may be applied to the driving lines TX1-1, TX2-1, TX3-1, TX1-2, TX2-2, and TX3-2 through the touch pad part TPP. Accordingly, the touch driving signal may be provided to the first touch electrode arrays TEA1. A touch sensing signal sensed from the second touch electrode arrays TEA2 may be applied to the sensing lines RX1, RX2, RX3, RX4, and RX5. Accordingly, the touch sensing signal may be applied to the touch driving circuit (e.g., the touch driving circuit TDC of FIG. 1) through the touch pad part TPP, and the touch driving circuit may calculate the user's touch position by analyzing the touch sensing signal.

The ground lines ES1 and ES2 may be disposed (or located) at the outermost part of the driving lines TX1-1, TX2-1, TX3-1, TX1-2, TX2-2, and TX3-2 and the sensing lines RX1, RX2, RX3, RX4, and RX5. The ground lines ES1 and ES2 may include a first ground line ES1 and a second ground line ES2. The first and second ground lines ES1 and ES2 may surround the sensing area SA, the driving lines TX1-1, TX2-1, TX3-1, TX1-2, TX2-2, and TX3-2, and the sensing lines RX1, RX2, RX3, RX4, and RX5 in a ring shape in the plan view. The first ground line ES1 and the second ground line ES2 may not be connected to each other.

The first ground line ES1 may cover a portion of the sensing lines RX1, RX2, RX3, RX4, and RX5 located on a right side of the sensing area SA and a portion of the sensing lines RX1, RX2, RX3, RX4, and RX5 extending in the first direction DR1 at a lower side of the sensing area SA.

The second ground line ES2 may cover a portion of the driving lines TX1-1, TX2-1, TX3-1, TX1-2, TX2-2, and TX3-2 located on a left side of the sensing area SA and a portion of the driving lines TX1-1, TX2-1, TX3-1, TX1-2, TX2-2, and TX3-2 extending in the first direction DR1 at an upper side and the lower side of the sensing area SA.

A first reference voltage signal may be applied to each of the first and second ground lines ES1 and ES2. Each of the first and second ground lines ES1 and ES2 may alleviate electrostatic shock which may be applied to the driving lines TX1-1, TX2-1, TX3-1, TX1-2, TX2-2, and TX3-2, the sensing lines RX1, RX2, RX3, RX4, and RX5, the first touch electrode arrays TEA1, and the second touch electrode arrays TEA2 from the outside.

The guard lines G1, G2, G3, and G4 may be disposed (or located) between the driving lines TX1-1, TX2-1, TX3-1, TX1-2, TX2-2, and TX3-2 and the sensing lines RX1, RX2, RX3, RX4, and RX5 and/or between the driving lines TX1-1, TX2-1, TX3-1, TX1-2, TX2-2, and TX3-2 and the sensing lines RX1, RX2, RX3, RX4, and RX5, and each ground line ES1 and ES2. The guard lines G1, G2, G3, and G4 may include a first guard line G1, a second guard line G2, a third guard line G3, and a fourth guard line G4.

The first guard line G1 may be disposed (or located) between the sensing lines RX1, RX2, RX3, RX4, and RX5 and the first ground line ES1. The second guard line G2 may be disposed (or located) between the driving lines TX1-1, TX2-1, TX3-1, TX1-2, TX2-2, and TX3-2 and the sensing lines RX1, RX2, RX3, RX4, and RX5. The third guard line G3 may be disposed (or located) between the first driving lines TX1-1, TX2-1, and TX3-1 and the second driving lines TX1-2, TX2-2, and TX3-2. The fourth guard line G4 may be disposed (or located) between the second driving lines TX1-2, TX2-2, and TX3-2 and the second ground line ES2.

A second reference voltage signal may be applied to each of the first, second, third, and fourth guard lines G1, G2, G3, and G4. Each of the first, second, third, and fourth guard lines G1, G2, G3, and G4 may prevent signal interference which may occur between adjacent lines. For example, the first guard line G1 may prevent mutual signal interference between the sensing lines RX1, RX2, RX3, RX4, and RX5 and the first ground line ES1, the second guard line G2 may prevent mutual signal interference between the driving lines TX1-1, TX2-1, TX3-1, TX1-2, TX2-2, and TX3-2 and the sensing lines RX1, RX2, RX3, RX4, and RX5, the third guard line G3 may prevent mutual signal interference between the first driving lines TX1-1, TX2-1, and TX3-1 and the second driving lines TX1-2, TX2-2, and TX3-2, and the fourth guard line G4 may prevent mutual signal interference between the second driving lines TX1-2, TX2-2, and TX3-2 and the second ground line ES2.

Figure 7:
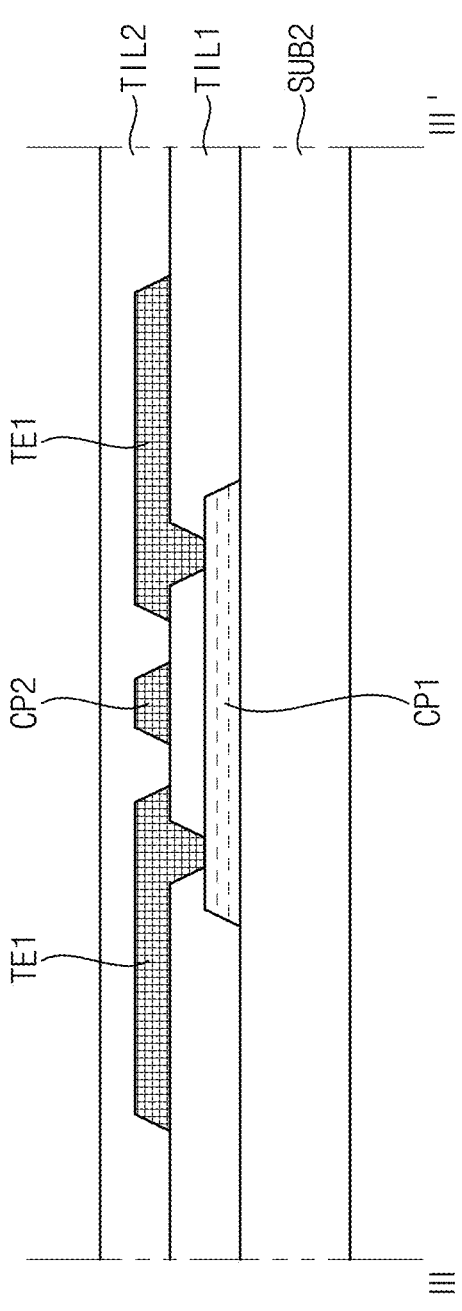
FIG. 7 is a cross-sectional view taken along line a III-III' of FIG. 6.
Figure 7:
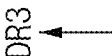

FIG. 7 is a cross-sectional view taken along a line III-III' of FIG. 6.

Referring to FIGS. 6 and 7, the touch sensing layer (e.g., the touch sensing layer TSL of FIG. 2) of the touch panel TP may further include a first touch insulating layer TIL1 and a second touch insulating layer TIL2.

The first connection portion CP1 may be disposed (or located) on the second substrate SUB2. The first touch insulating layer TIL1 may be disposed (or located) on the second substrate SUB2. The first touch insulating layer TIL1 may cover the first connection portion CP1.

For example, the first touch insulating layer TIL1 may include silicon oxide, silicon nitride, silicon oxynitride, or the like. These can be used alone or in combination with each other. In an embodiment, the first touch insulating layer TIL1 may include silicon dioxide ($SiO_2$).

The first touch electrode TE1, the second touch electrode TE2, and the second connection part CP2 may be disposed (or located) on the first touch insulating layer TIL1. The second touch insulating layer TIL2 may be disposed (or located) on the first touch insulating layer TIL1. The second touch insulating layer TIL2 may cover the first touch electrode TE1, the second touch electrode TE2, and the second connection portion CP2.

For example, the second touch insulating layer TIL2 may include silicon oxide, silicon nitride, silicon oxynitride, or the like. These can be used alone or in combination with each other. In an embodiment, the second touch insulating layer TIL2 may include silicon dioxide ($SiO_2$).

Figure 8:
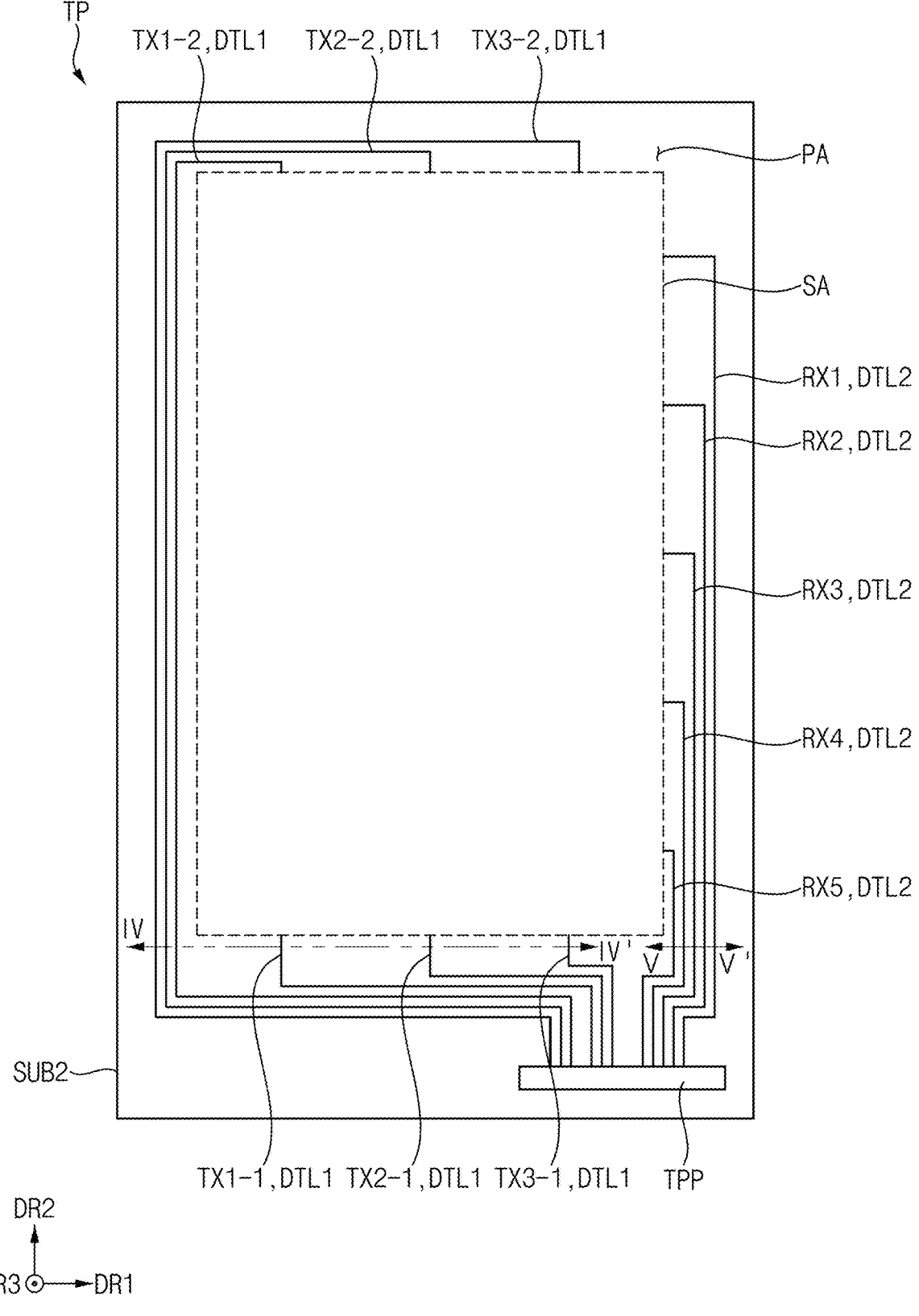
FIG. 8 is a plan view showing driving lines, sensing lines, and detection lines of FIG. 5.

FIG. 8 is a plan view showing driving lines, sensing lines, and detection lines of FIG. 5.

Figure 9:
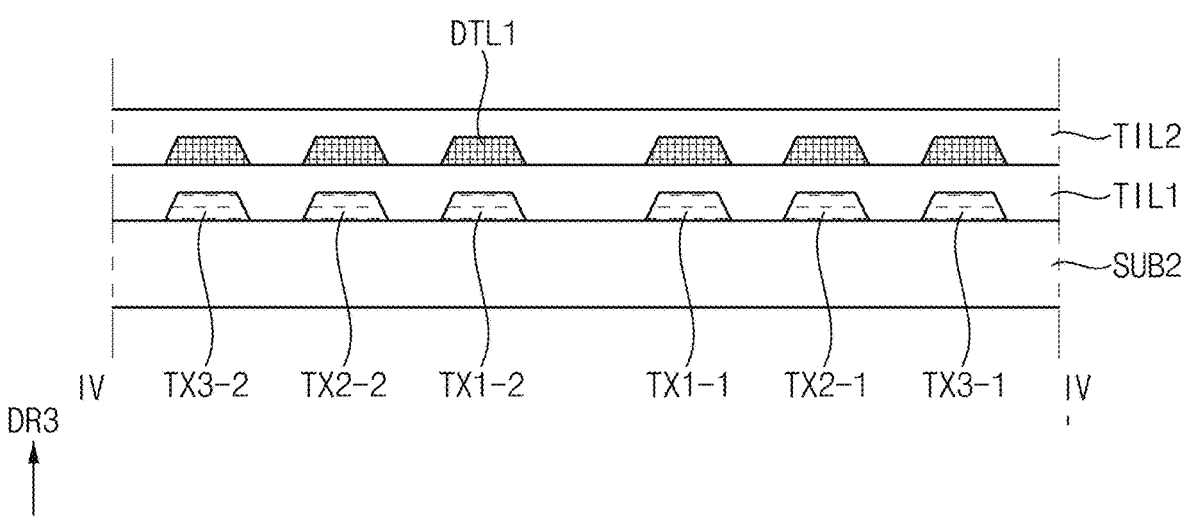
FIG. 9 is a cross-sectional view taken along line a IV-IV' of FIG. 8.
Figure 10:
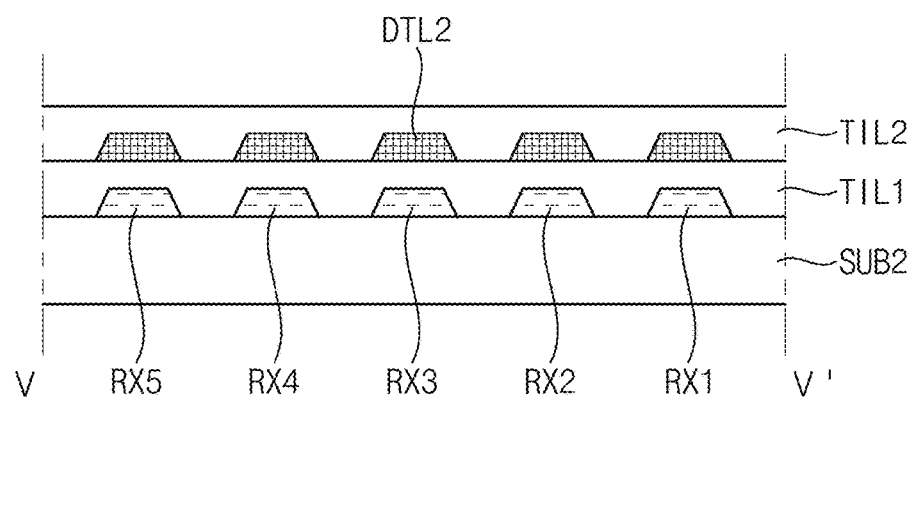
FIG. 10 is a cross-sectional view taken along line a V-V' of FIG. 8.

Referring to FIGS. 8, 9, and 10, in an embodiment, the touch sensing layer (e.g., the touch sensing layer TSL of FIG. 2) of the touch panel TP may further include a plurality of detection lines DTL1 and DTL2 overlapping the driving lines TX1-1, TX2-1, TX3-1, TX1-2, TX2-2, and TX3-2 and the sensing lines RX1, RX2, RX3, RX4, and RX5 in the plan view, respectively.

The detection lines DTL1 and DTL2 may include first detection lines DTL1 overlapping the driving lines TX1-1, TX2-1, TX3-1, TX1-2, TX2-2, and TX3-2 in the plan view, respectively, and second detection lines DTL2 overlapping the sensing lines RX1, RX2, RX3, RX4, and RX5 in the plan view, respectively.

In an embodiment, each of the driving lines TX1-1, TX2-1, TX3-1, TX1-2, TX2-2, and TX3-2 may be completely covered by the first detection lines DTL1, and each of the sensing lines RX1, RX2, RX3, RX4, and RX5 may be completely covered by the second detection lines DTL2.

In an embodiment, the first detection lines DTL1 and the second detection lines DTL2 may be connected to the touch pad part TPP. Accordingly, the first detection lines DTL1 and the second detection lines DTL2 may be electrically connected to the second circuit board (e.g., the second circuit board CB2 of FIG. 1).

Current may flow from the second circuit board to the detection lines DTL1 and DTL2. By comparing the current values of the detection lines DTL1 and DTL2, it is possible to determine whether the detection lines DTL1 and DTL2 are defective due to scratches. A detailed description of this will be provided later.

FIG. 9 is a cross-sectional view taken along a line IV-IV' of FIG. 8. FIG. 10 is a cross-sectional view taken along a line V-V' of FIG. 8.

Referring to FIGS. 9 and 10, the driving lines TX1-1, TX2-1, TX3-1, TX1-2, TX2-2, and TX3-2 and the sensing lines RX1, RX2, RX3, RX4, and RX5 may be disposed (or located) on the second substrate SUB2.

The driving lines TX1-1, TX2-1, TX3-1, TX1-2, TX2-2, and TX3-2 and the sensing lines RX1, RX2, RX3, RX4, and RX5 may include molybdenum (Mo), aluminum (Al), platinum (Pt), silver (Ag), gold (Au), nickel (Ni), titanium (Ti), tantalum (Ta), copper (Cu), niobium (Nb), or the like. These can be used alone or in combination with each other. Each of the driving lines TX1-1, TX2-1, TX3-1, TX1-2, TX2-2, and TX3-2 and the sensing lines RX1, RX2, RX3, RX4, and RX5 may be formed of single-layer or multi-layer. In an embodiment, the driving lines TX1-1, TX2-1, TX3-1, TX1-2, TX2-2, and TX3-2 and the sensing lines RX1, RX2, RX3, RX4, and RX5 may include molybdenum-niobium (MoNb).

In an embodiment, the driving lines TX1-1, TX2-1, TX3-1, TX1-2, TX2-2, and TX3-2 and the sensing lines RX1, RX2, RX3, RX4, and RX5 may include the same material as the first connection portion CP1, which is depicted in FIG. 7, and may be disposed (or located) on the same layer as the first connection portion CP1. That is, driving lines TX1-1, TX2-1, TX3-1, TX1-2, TX2-2, and TX3-2 and the sensing lines RX1, RX2, RX3, RX4, and RX5 may be formed through the same process as the first connection portion CP1.

The first touch insulating layer TIL1 may cover the driving lines TX1-1, TX2-1, TX3-1, TX1-2, TX2-2, and TX3-2 and the sensing lines RX1, RX2, RX3, RX4, and RX5.

The detection lines DTL1 and DTL2 may be disposed (or located) on the first touch insulating layer TIL1. The detection lines DTL1 and DTL2 may include conductive metal oxide. For example, the detection lines DTL1 and DTL2 may include indium gallium oxide (IGO), indium zinc oxide (IZO), indium tin oxide (ITO), indium zinc tin oxide (IZTO), indium gallium zinc oxide (IGZO), or the like. These can be used alone or in combination with each other. In an embodiment, the detection lines DTL1 and DTL2 may include indium tin oxide (ITO).

In an embodiment, the detection lines DTL1 and DTL2 may include the same material as the first touch electrode TE1, the second touch electrode TE2, and the second connection portion CP2, which are depicted in FIG. 7, and may be disposed (or located) on the same layer as the first touch electrode TE1, the second touch electrode TE2, and the second connection portion CP2 of FIG. 7. The detection lines DTL1 and DTL2 may be formed through the same process as the first touch electrode TE1, the second touch electrode TE2, and the second connection part CP2.

In an embodiment, a width of each of the first detection lines DTL1 may be the same as a width of each of the driving lines TX1-1, TX2-1, TX3-1, TX1-2, TX2-2, and TX3-2, and a width of each of the second detection lines DTL2 may be the same as a width of each of the detection lines RX1, RX2, RX3, RX4, and RX5.

The second touch insulating layer TIL2 may cover the detection lines DTL1 and DTL2.

Figure 11:
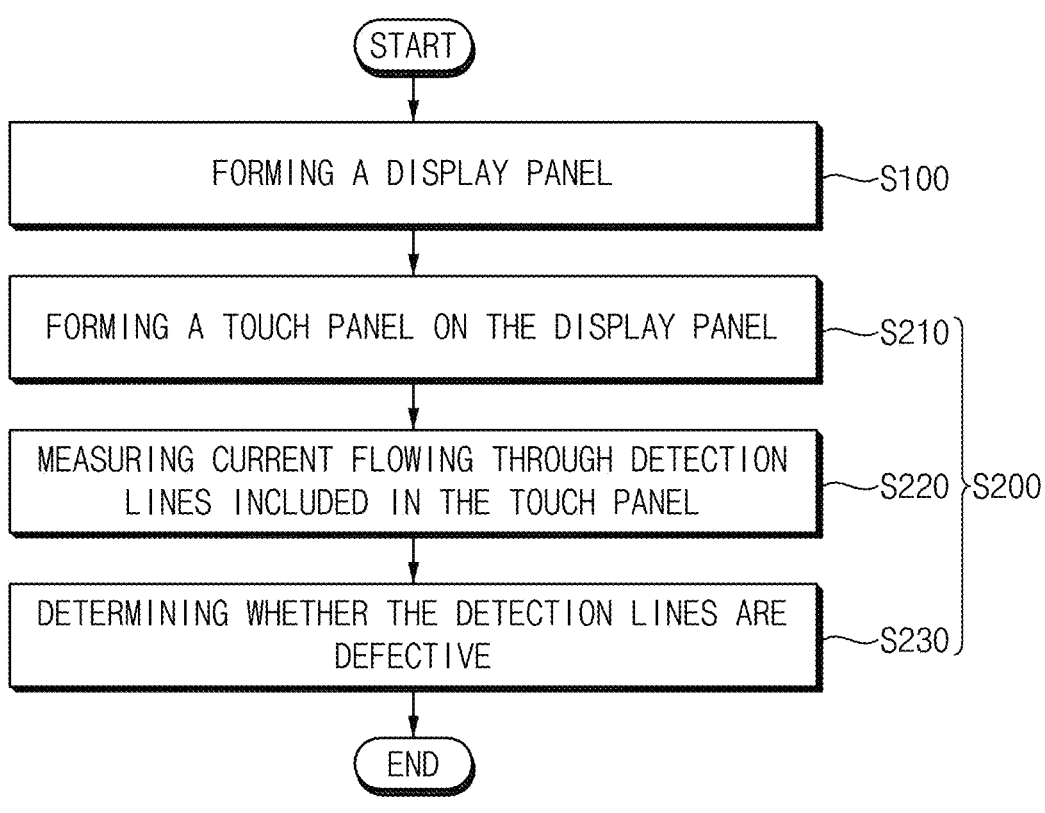
FIG. 11 is a flowchart explaining a method of manufacturing the display device according to an embodiment of the present disclosure.

FIG. 11 is a flowchart explaining a method of manufacturing the display device according to an embodiment of the present disclosure.

Referring to FIGS. 1, 2, 3, 5, and 11, as a first step, the display panel DP may be formed (S100). The display panel DP may include the first substrate SUB1, the circuit layer CL formed on the first substrate SUB1, and the light-emitting element layer EL formed on the circuit layer CL.

After forming the display panel DP, inspection of the touch panel TP may be performed (S200). That is, after forming the display panel DP, the touch panel TP may be inspected for defects. Hereinafter, a method of inspecting the touch panel TP will be described.

First, the touch panel TP may be formed on the display panel DP (S210). The touch panel TP may include the second substrate SUB2 and the touch sensing layer TSL formed on the second substrate SUB2. Components of the touch sensing layer TSL are the same as described with reference to FIGS. 5 to 8.

In an embodiment, the current flowing through each of the detection lines DTL1 and DTL2 may be measured (S220). After measuring the current flowing through each of the detection lines DTL1 and DTL2, it may be determined whether the detection lines DTL1 and DTL2 are defective due to scratches (S230). For example, by comparing the values of the current flowing through the detection lines DTL1 and DTL2, the detection line through which a current smaller than a predetermined reference current value flows, among the detection lines DTL1 and DTL2, may be determined as defective. The predetermined reference current may be a current flowing through the detection line when the detection line is non-defective.

For example, if the second detection line DTL2 overlapping the first sensing line RX1 in the plan view among the sensing line RX1, RX2, RX3, RX4, and RX5 is non-defective, the current flowing through the second detection line DTL2 may be defined as the predetermined reference current. If the second detection line DTL2 overlapping the first sensing line RX1 in the plan view is determined to be defective, the value of the current flowing through the second detection line DTL2 may be less than the value of the predetermined reference current.

Accordingly, the display device DD of FIGS. 1 and 2 may be manufactured.

Referring again to FIGS. 1 to 11, the touch panel TP according to an embodiment of the present disclosure may include the plurality of detection lines DTL1 and DTL2 located in the peripheral area PA surrounding at least a portion of the sensing area SA and overlapping each of the plurality of driving lines TX1-1, TX2-1, TX3-1, TX1-2, TX2-2, TX3-2 and the plurality of sensing lines RX1, RX2, RX3, RX4, and RX5 in the plan view. By comparing the values of current flowing through the detection lines DTL1 and DTL2, it is possible to determine whether the detection lines DTL1 and DTL2 are defective due to scratches. Accordingly, by detecting scratched detection lines in advance, and after reliability evaluation in a high-temperature and high-humidity environment, it is possible to prevent a decline in the manufacturer's reliability due to the shipment of defective products containing the detection line corroded and scratched by moisture infiltration.

Figure 12:
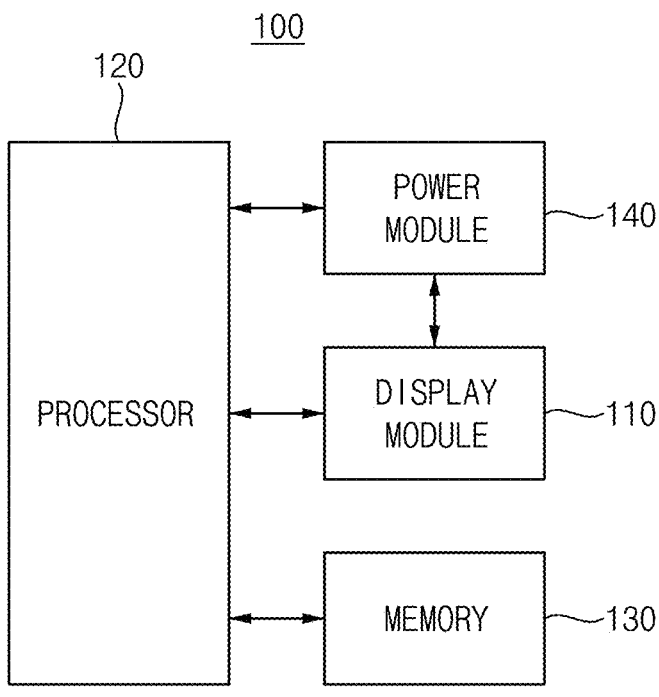
FIG. 12 is a block diagram showing an electronic device according to an embodiment of the present disclosure.

FIG. 12 is a block diagram showing an electronic device according to an embodiment of the present disclosure.

Referring to FIG. 12, an electronic device 100 may include a display module 110, a processor 120, a memory 130, and a power module 140.

A display device according to an embodiment (e.g., the display device DD illustrated in FIG. 1) may be applied to various electronic devices 100. The electronic device 100 may include the display device described above, and may further include modules or devices with additional functions other than the display device.

The processor 120 may include at least one of a central processing unit (CPU), an application processor (AP), a graphic processing unit (GPU), a communication processor (CP), an image signal processor (ISP), and a controller.

The memory 150 may store data information necessary for the operation of the processor 120 or the display module 110. When the processor 120 executes the application stored in the memory 150, an image data signal and/or an input control signal may be transmitted to the display module 110, and the display module 110 may process the received signal and output image information through a display screen.

The power module 140 may include a power supply module, such as a power adapter or a battery device, and a power conversion module which converts the power supplied by the power supply module to generate power required for the operation of the electronic device 100.

At least one of each component of the electronic device 100 described above may be included in the display device according to the above-described embodiments. In addition, some of the individual modules functionally included in one module may be included in the display device, and other portions may be provided separately from the display device. For example, the display device may include the display module 110, and the processor 120, the memory 130, and the power module 140 may be provided in the form of other devices within the electronic device 100 other than the display device. In other words, the processor 120 may provide the image data signal and the input control signal to the display device to control the display device.

Figure 13:
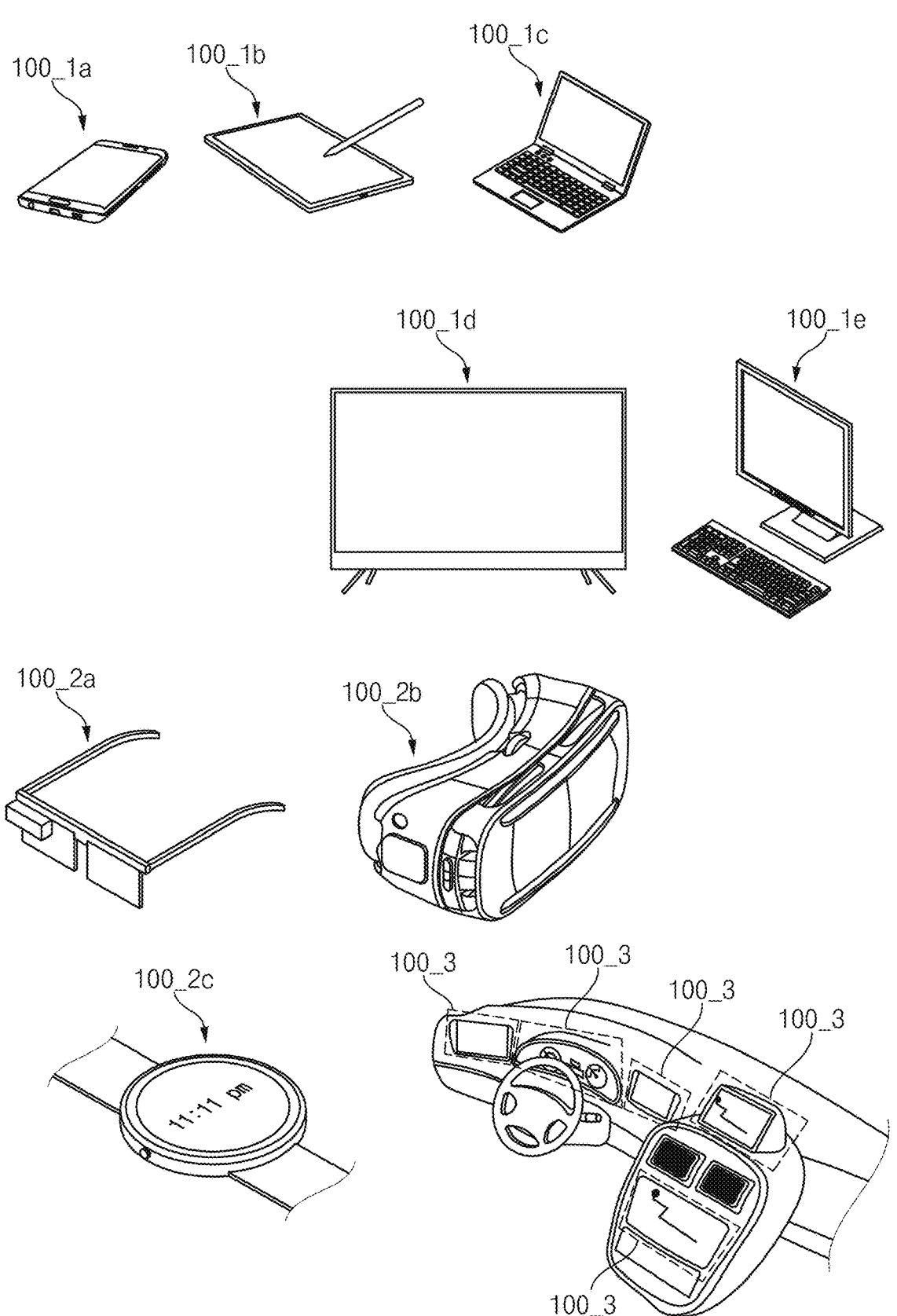
FIG. 13 is a schematic diagram showing electronic devices.

FIG. 13 is a schematic diagram showing electronic devices.

Referring to FIG. 13, various electronic devices 100 to which display devices according to the embodiments (e.g., the display device DD shown in FIG. 1) are applied may include not only image display electronic devices such as a smartphone 100_1*a*, a tablet PC 100_1*b*, a laptop 100_1*c*, a TV 100_1*d*, and a desktop monitor 100_1*e*, but also wearable electronic devices including display modules, such as smart glasses 100_2*a*, a head-mounted display 100_2*b*, and a smart watch 100_2*c*, automotive electronic devices 100_3 including display modules, such as a dashboard of a car, a center fascia, a Center Information Display (CID) disposed on a dashboard, and a room mirror display, or the like.

The present disclosure can be applied to various display devices which can be equipped with a display device. For example, the present disclosure can be applied to high-resolution smartphones, mobile phones, smart pads, smart watches, tablet PCs, vehicle navigation systems, televisions, computer monitors, laptops, or the like.

The foregoing is illustrative of embodiments and is not to be construed as limiting thereof. Although the above has been explained with reference to embodiments of the present disclosure, it will be understood that a person with ordinary knowledge in the field of technology may modify and change the present disclosure in various ways without materially departing from the novel teaching and advantages of the present disclosure. Accordingly, it will be understood that all such modifications are intended to be included within the scope of the present disclosure as defined in the following claims.

What is claimed is:

1. A touch panel comprising:
   a substrate including a sensing area and a peripheral area surrounding at least a portion of the sensing area, wherein a user's touch is not sensed in the peripheral area;
   a plurality of driving lines disposed in the peripheral area on the substrate;
   a plurality of sensing lines disposed on a same layer as the driving lines and disposed in the peripheral area;
   a first touch insulating layer covering the driving lines and the sensing lines;
   a first touch electrode array disposed in the sensing area on the first touch insulating layer, the first touch electrode array electrically connected to the driving lines and including a plurality of first touch electrodes arranged along a first direction;
   a second touch electrode array disposed on a same layer as the first touch electrode array and disposed in the sensing area, the second touch electrode array electrically connected to the sensing lines and including a plurality of second touch electrodes arranged along a second direction intersecting the first direction; and
   a plurality of detection lines disposed in the peripheral area on the first touch insulating layer,
   wherein each of the driving lines and the sensing lines overlaps a corresponding detection line of the plurality of detection lines in a plan view.

2. The touch panel of claim 1, wherein the detection lines include:
   first detection lines overlapping the driving lines in the plan view; and
   second detection lines overlapping the sensing lines in the plan view, and
   wherein each of the driving lines is completely covered by the first detection lines and each of the sensing lines is completely covered by the second detection lines.

3. The touch panel of claim 2, wherein a width of each of the first detection lines is a same as a width of each of driving lines, and
   a width of each of the second detection lines is a same as a width of each of the sensing lines.

4. The touch panel of claim 1, further comprising:
   a touch pad part disposed in the peripheral area on the substrate and providing touch driving signals to the first touch electrodes through the driving lines.

5. The touch panel of claim 4, wherein the driving lines, the sensing lines, and the detection lines are connected to the touch pad part.

6. The touch panel of claim 1, wherein the detection lines are disposed on a same layer as the first and second touch electrodes.

7. The touch panel of claim 1, wherein the detection lines include conductive metal oxide.

8. The touch panel of claim 1, wherein the detection lines include indium tin oxide (ITO).

9. The touch panel of claim 1, further comprising:
   a second touch insulating layer covering the first and second touch electrodes, the detection lines, and including silicon compound.

10. The touch panel of claim 9, wherein one of the first touch insulating layer and the second touch insulating layer includes silicon oxide.

11. The touch panel of claim 1, wherein one of the driving lines and the sensing lines includes molybdenum-niobium (MoNb).

12. The touch panel of claim 1, wherein the substrate includes glass.

13. A method of inspecting a touch panel, the method comprising:
   forming a touch panel including:
      a substrate including a sensing area and a peripheral area surrounding at least a portion of the sensing area, wherein a user's touch is not sensed in the peripheral area;
      a plurality of driving lines disposed in the peripheral area on the substrate;
      a plurality of sensing lines disposed on a same layer as the driving lines and disposed in the peripheral area;
      a first touch insulating layer covering the driving lines and the sensing lines;
      a first touch electrode array disposed in the sensing area on the first touch insulating layer, the first touch electrode array electrically connected to the driving lines and including a plurality of first touch electrodes arranged along a first direction;
      a second touch electrode array disposed on a same layer as the first touch electrode array and disposed in the sensing area, the second touch electrode array electrically connected to the sensing lines and including a plurality of second touch electrodes arranged along a second direction intersecting the first direction; and
      a plurality of detection lines disposed in the peripheral area on the first touch insulating layer, and
   measuring a current flowing through each of the detection lines,
   wherein each of the driving lines and the sensing lines overlaps a corresponding detection line of the plurality of detection lines in a plan view.

14. The method of claim 13, after measuring the current flowing through each of the detection lines, further comprising:

determining whether a detection line among the detection lines is defective by comparing values of the current flowing through each of the detection lines, wherein, when the current flowing through the detection line is smaller than a predetermined reference current value, the detection line is determined as defective, and wherein the predetermined reference current is a current flowing through the detection line when the detection line is non-defective.

15. The method of claim 13, wherein the detection lines include:

first detection lines overlapping the driving lines in the plan view; and second detection lines overlapping the sensing lines in the plan view, and wherein each of the driving lines is completely covered by the first detection lines and each of the sensing lines is completely covered by the second detection lines.

16. The method of claim 13, wherein a width of each of the first detection lines is a same as a width of each of the driving lines, and a width of each of the second detection lines is a same as a width of each of the sensing lines.

17. The method of claim 13, wherein the touch panel further includes:

a touch pad part disposed in the peripheral area on the substrate and providing touch driving signals to the first touch electrodes through the driving lines, wherein the driving lines, the sensing lines, and the detection lines are connected to the touch pad part.

18. The method of claim 13, wherein the detection lines are formed through a same process as the first and second touch electrodes.

19. The method of claim 13, wherein the touch panel further includes:

a second touch insulating layer covering the first and second touch electrodes, the detection lines, and including silicon compound.

20. An electronic device comprising:

a display panel including:

a first substrate including a display area and a non-display area surrounding at least a portion of the display area, wherein a user's touch is not sensed in the non-display area;

a circuit layer disposed on the first substrate; and a light-emitting element layer disposed on the circuit layer, a touch panel disposed on the display panel and including:

a second substrate including a sensing area and a peripheral area surrounding at least a portion of the sensing area;

a plurality of driving lines disposed in the peripheral area on the second substrate;

a plurality of sensing lines disposed on a same layer as the driving lines and disposed in the peripheral area;

a first touch insulating layer covering the driving lines and the sensing lines;

a first touch electrode array disposed in the sensing area on the first touch insulating layer, the first touch electrode array electrically connected to the driving lines and including a plurality of first touch electrodes arranged along a first direction;

a second touch electrode array disposed on a same layer as the first touch electrode array in the sensing area, the second touch electrode array electrically connected to the sensing lines and including a plurality of second touch electrodes arranged along a second direction intersecting the first direction; and a plurality of detection lines disposed in the peripheral area on the first touch insulating layer, and a processor providing an image data signal and an input control signal to the display panel to control the display panel, wherein each of the driving lines and the sensing lines overlaps a corresponding detection line of the plurality of detection lines in a plan view.

* * * * *